United States Patent Office 3,274,081
Patented Sept. 20, 1966

3,274,081
ELECTROCHEMICAL PROCESS FOR MAKING FLUORINE - CONTAINING CARBON COMPOUNDS
Wilbur H. Pearlson, White Bear Lake, Minn., assignor to Minnesota Mining and Manufacturing Company, St. Paul, Minn., a corporation of Delaware
No Drawing. Filed Sept. 20, 1962, Ser. No. 225,150
7 Claims. (Cl. 204—59)

This invention relates to an electrochemical process for making fluorine-containing carbon compounds by electrolyzing, in a cell containing an electrode pack, a current-conducting electrolyte solution comprising anhydrous liquid hydrogen fluoride mixed with a halogen-substituted organic starting compound. In one aspect, the invention relates to an improvement in such a process for making fluorine-containing acid halides.

The electrochemical process to which the present invention applies is known in the art as an electrolytic process for making fluorine-containing carbon compounds and is disclosed in Patent No. 2,519,983—Simons; Patent No. 2,717,871—Scholberg et al.; Patent No. 2,732,398—Brice et al.; and pages 417–8 of the book entitled Fluorine Chemistry, vol. I, edited by J. H. Simons, published by Academic Press, Inc., 1950. The process utilizes an electrode pack. The electrode pack comprises alternating and closely-spaced iron cathode plates and nickel anode plates. The voltage applied to the cell is in the range of approximately 4 to 8 volts D.C., and the cell can be operated substantially at atmospheric pressure at temperatures ranging from below about 0° C. to about 20° C. or at higher temperatures and pressures. The organic starting material may suitably be initially present in admixture in the electrolytic solution of hydrogen fluoride in an amount between about 5% and about 20% by weight. Both the organic starting material and the hydrogen fluoride electrolyte are replenished from time to time as utilized. The exit gas mixture is passed through a refrigerated condenser to condense out most of the hydrogen fluoride vapors that are evolved, and the liquefied hydrogen is then drained back into the cell. The fluorinated products of the process are insoluble in liquid hydrogen fluoride and either settle to the bottom of the cell, or evolve with the hydrogen fluoride and other gaseous products, depending upon the volatility, and can be readily recovered as above by refrigeration and condensation. A large variety of starting materials may be utilized in the process.

The first of the above patents relates to the basic process for electrochemical fluorination in general. The second of the above-cited patents relates particularly to the electrochemical fluorination of carboxylic acid halides (compounds containing one or more carbonyl halide groups), and the third reference to sulfonic acid halides (compounds containing one or more sulfonyl halide groups). The process of these patents results in fluorination by replacement of all carbon-bonded hydrogen atoms by fluorine atoms, and saturation of aromatic rings or other unsaturated structures (when present) by addition of fluorine.

In producing fluorinated acid halides from hydrocarbon acid halides, the process is characterized by relatively low yields of the desired open chain product as the result of chain fragmentation or cleavage and cyclization. Often the desired product is the fluorinated cyclic compound, but there has been no method to selectively control the reaction to produce either the cyclic or open chain compound in preference to the other. It is much to be desired to provide a process which selectively increases the yield of the desired fluorinated acid halide and to control or minimize fragmentation and cleavage.

An object of this invention is to provide an improvement in the electrochemical process for the production of fluorine-containing carbon compounds.

It is also an object to increase the yield of acid halides obtainable from an electrochemical cell.

It is another object of this invention to control the selectivity and yield of the electrochemical reaction toward the open chain or cyclic fluorinated derivative of the starting acid halide.

It is still another object of this invention to prevent cleavage of the starting compound at the weak point in the chain in an electrochemical process.

Various other objects and advantages of the present invention will become apparent to those skilled in the art from the accompanying description and disclosure.

The present invention resides in the use of new starting compounds for the production of fluorine-containing acid halides, cyclic ethers and alkanes in an electrolytic cell as described above and shown in the literature. The starting compounds of the present invention are the partially chain halogen-substituted acid halides having from 3 to 12 carbon atoms per molecule. The acid halide starting materials contain an organic open chain having at least 2 carbon atoms in the chain attached to the acid halide radical which chain skeleton contains only carbon and not more than one hetero atom, such as a chalkogen, usually ether oxygen. The chalkogen, if present in the organic chain, is separated from the acid halide radical by at least one carbon atom. The acid halide starting compounds of this invention also have at least one carbon atom of the chain which is hydrogen-bearing or unsaturated.

In accordance with this invention the location of the halogen substitution in the chain of the starting compounds and the kind of halogen substituted are utilized to control the structure of the product produced, as well as the yield and selectivity of the desired product.

The gaseous halogens (chlorine and fluorine), when substituted on a carbon atom, tend to stabilize that carbon atom and even adjacent atoms to reaction and/or cleavage. The opposite effect is observed when the halogen substitution is bromine or iodine, because these halogens are easily removed during the electrochemical fluorination. Accordingly, the kind of halogen substitution is used in accordance with this invention to either cause or prevent a reaction or cleavage at or adjacent to the point of halogen substitution.

The location of the carbon atom on which the halogen is substituted in place of hydrogen will determine the point of reaction or the point of cleavage, or the point of increased stability, and thus the structure of the product of the electrochemical reaction when starting with a compound having attached thereto a functional group such as an acid halide radical; for example, a carbonyl halide radical or a sulfonyl halide radical. When the acid halide contains a sufficient number of polyvalent atoms, such as carbon, oxygen and sulfur, to form a potential five- or six-membered ring, the use of the correct halogen at the proper location will either inhibit or promote substantial ring formation by cyclization through internal reaction of the acid radical with the chain of the starting compound. Even the unsaturated hydrocarbon acid halides have a tendency to form ring compounds during electrochemical fluorination. Therefore, the electrochemical fluorination of acid halides containing no halogen substitution of the chain attached to the acid halide radical results in a product mixture of both cyclic and non-cyclic products. The substitution of a gaseous halogen on the carbon atom, which is the fifth or sixth atom of the potential ring, will effectively reduce or prevent ring formation, thus increasing the yield of non-cyclic fluorinated products and selectively of the electrochemical reaction in general.

In order to control the type of fluorinated product produced, i.e., cyclic or open chain, the third atom of the organic chain may contain at least one halogen substitution when the third atom is carbon. If the fourth atom of the chain is carbon, it also can be halogen-substituted. Therefore, to increase selectivity toward the desired product, either or both the third and fourth atoms must be halogen-substituted. When the third atom is a chalkogen, then the fourth atom of the organic chain is carbon and must be halogen-substituted.

When an open chain product is desired, the halogen substitution in either or both of the above locations is a normally gaseous halogen.

When a cyclic product is desired, the halogen substitution is bromine or iodine, and the substitution is made on the third atom of the chain for a five-membered ring product, or the fourth atom for a six-membered ring product. Cyclization is accomplished by reaction of the oxygen atom of the acid halide radical with the third or fourth atom of the organic chain attached to the acid radical to form a five-membered or six-membered ring.

When a hetero atom is present in the organic chain attached to the acid halide radical and the cyclic product is produced during the electrochemical fluorination, this cyclic product so produced usually decomposes in the reaction mixture because an organic ring containing two hetero atoms in the ring, such as two oxygen atoms attached to same carbon, is unstable. Therefore, when electro-fluorinating an acid halide containing a hetero atom, such as oxygen, in the organic chain, it is difficult, if not impossible, to produce a stable cyclic product, and it is particularly important to minimize cyclization in order to increase the yield of the fluorinated acid halide product. This can be achieved by the substitution of gaseous halogen on the proper carbon atom.

Also the cyclic products of the sulfonyl halides, if theoretically produced, are unstable as compared with the cyclic product of the carbonyl halides which are stable; therefore, it is particularly important to have normally gaseous halogen substitution on the proper carbon atom if the sulfonyl halides are to prevent cyclization and consequent cleavage.

When a hetero atom, such as a chalkogen, is located in the chain of the acid halide starting compound, there is a strong tendency for cleavage adjacent this hetero atom which results in fragmentation and low yield of fluorinated product corresponding to the starting compound. In most instances, the lower molecular weight by-products are not as useful or desirable as non-cleaved products, and the selectivity of the electrochemical reaction toward the non-cleaved or non-fragmented products is poor when a hetero atom is present in the chain. The substitution of gaseous halogen on the carbon atom adjacent the hetero atom, preferably the carbon atom furthest removed from the acid radical which is adjacent the hetero atom, minimizes or prevents cleavage and fragmentation during the electrochemical fluorination of an acid halide starting compound, such as an ether acid halide. Where alkanes or short chain fluorinated products are desired when starting with an acid halide containing a hetero atom in the chain, the substitution of bromine, or iodine on the carbon atom adjacent the hetero atoms increases the production of cleaved or fragmented products because the bromine or iodine increases the tendency for cleavage adjacent the hetero atom.

There is also a tendency for cleavage of the acid halide starting compound during electrochemical fluorination at the point between the alpha carbon atom and the acid radical resulting in low yield of fluorinated acid halides and increased yield of fluorinated chains or alkanes. The substitution of the alpha carbon of the acid halide with gaseous halogen minimizes or prevents such cleavage and increases the yield and selectivity of the electrochemical fluorination reaction toward the fluorinated acid halide.

For stabilization of the carbon atom substituted with halogen, it is preferred that the halogen be fluorine and that the carbon atom be completely substituted with halogen. In the case of more than one halogen substitution on a carbon atom, it is preferred that the substitution be the same halogen for each substitution but the substitution need not necessarily be the same halogen; for example, the substitution on a single carbon atom may be both fluorine and chlorine, all fluorine, or all chlorine.

In the case of carbon substitution with bromine and iodine, one halogen substitution on the carbon atom is quite sufficient, although multiple substitution may be utilized without departing from the scope of this invention. In this instance, bromine substitution is preferred. In the case of multiple halogen substitution on a single carbon atom, it is preferred to have all halogens the same; for example, all bromine or all iodine.

The following partially halogen-substituted acid halides are useful for the production of the corresponding halogen-substituted open chain acid halides:

*Starting compound and major product derived therefrom*

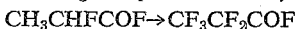
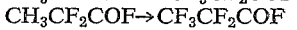
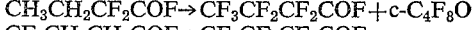
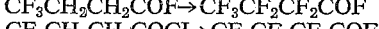
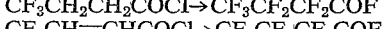
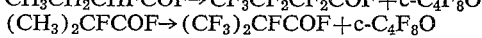
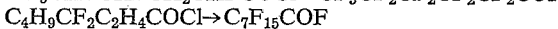
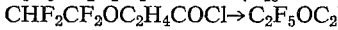
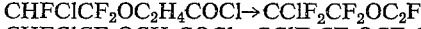
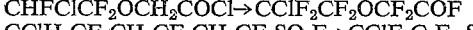
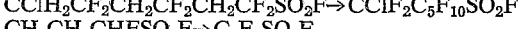
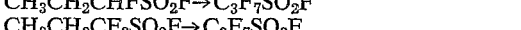
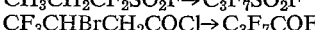
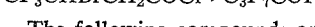
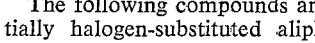

The following compounds are typical examples of partially halogen-substituted aliphatic acid halides useful for the preparation of completely halogenated cyclic ethers:

*Starting compound and major product derived therefrom*

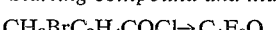
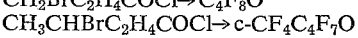
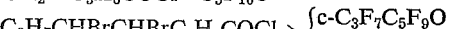

The following examples are offered as a better understanding of the present invention and should not be construed as unnecessarily limiting thereto.

*Example 1*

To a standard cell as previously described herein and in the aforesaid patents was charged 1900 grams of anhydrous HF, 5 grams of sodium fluoride and 80 grams of 4,4,4-trifluorobutyryl fluoride, $CF_3CH_2CH_2COF$. The cell was run at 25 amperes and 5.3 to 5.9 volts for seventeen hours. Additional 4,4,4-trifluorobutyryl fluoride was charged at the rate of 16.8 grams per hour for the first seven hours.

Products were condensed from the effluent hydrogen stream in traps cooled to $-80°$ C. and $-170°$ C. A total of 142.5 grams of product was obtained in the former and 34.8 grams in the latter trap. Analysis of the products showed a yield of $C_3F_7COF$ of over 60 percent of theoretical, compared to a yield of about 34 percent from unsubstituted butyryl fluoride. The yield of $c$-$C_4F_8O$ was less than one percent, compared to 24 percent from butyryl fluoride.

The 4,4,4-trifluorobutyryl fluoride can be prepared by the addition of iodotrifluoromethane to acrylic acid under conventional conditions followed by the hydrogenation of the adduct to remove the iodine. The acid is converted to the halide by reaction with SOCl₂ followed by treatment with HF.

*Example II*

About 100 grams of 4,4-difluorooctanoyl chloride, $C_4H_9CF_2C_2H_4COCl$, and 900 grams of anhydrous HF were initially charged to the standard electrochemical cell. The cell was run with one-half the normal charge, and accordingly, it was also run at one-half normal current, or 20 amperes and 4.9 volts. The cell was run for 110 hours with organic raw material additions at the rate of 5.7 grams per hour for the first 93 hours. Liquid products were obtained from the cell at an average rate of 9.7 grams per hour. Gaseous products were condensed at −80° C. (0.6 gram per hour) and −170° C. (1.1 grams per hour). Analysis of the products disclosed that substitution of 4,4-difluorooctanoyl chloride for unsubstituted octanoyl chloride as a raw material increased the $C_7F_{15}COF$ yield from 14 percent to 31 percent of theoretical, and decreased the yield of c-$C_3F_7C_5F_9O$ from 32 percent to 16 percent. It also caused preferential formation of the c-$C_3F_7C_5F_9O$ having a six-membered ring rather than the usual five-membered ring.

The 4,4-difluorooctanoyl chloride was prepared by oxidizing octyne-3-ol-1 with chromic acid to the corresponding octynoic acid which in turn was converted to the acid chloride with thionyl chloride. The latter product was reacted with anhydrous hydrogen fluoride to produce the desired material. All steps were carried out under conventional operating conditions.

*Example III*

To a standard cell was charged 1850 grams of anhydrous HF, 150 grams of a partially fluorinated raw material, $HCF_2CF_2OC_2H_4COCl$, and 5 grams of NaF. The cell ran smoothly at 40 amperes and 5.3 to 5.7 volts for one hundred hours, with 31 grams of additional organic being charged each hour for seventy-eight hours. Total product was obtained at a rate of 35 grams per hour. The yield of $C_2F_5OC_2F_4COF$ was 30 percent of theoretical, compared to 7 percent for the unsubstituted raw material.

The starting compound was prepared by the addition of beta-hydroxy propionic acid to tetrafluoroethylene and conversion of the acid to the acid halide by reaction with thionyl chloride.

*Example IV*

A standard cell was used with one-half the normal charge. Thus, an initial charge of 100 grams of $CF_3CH_2OC_2H_4COCl$ and 900 grams of anhydrous HF was charged. Subsequent organic charges were made at the rate of 11.8 grams per hour for the first thirty hours. The run lasted forty-six hours at an average current of 17.5 amperes at 6 volts. Crude products were obtained at a rate of 13 grams per hour. The yield of $$C_2F_5OC_2F_4COOH$$

was about 6 percent of theoretical, about the same as obtained from the hydrocarbon raw material. From the above, it is apparent that fluorine substitution on the fifth carbon atom of the organic chain containing a chalkogen (seventh atom of the potential ring chain) did not improve the yield or selectivity of the cell, and substitution should have been on the fourth carbon atom or carbon adjacent to the chalkogen.

The starting compound was prepared by reacting trifluoroethanol with beta-chloro propionic acid in alkaline media, and the acid converted to chloride by reaction with thionyl chloride.

*Example V*

An initial charge of 1850 grams of anhydrous HF, 5 grams NaF and 150 grams of $ClCFHCF_2OC_2H_4COCl$ was made to a standard cell. The cell ran smoothly at 40 amperes and 5.4 to 5.8 volts with additional organic raw material charged at a rate of 30.5 grams per hour for one hundred and forty hours. As usual make-up HF was added periodically to maintain the liquid level in the cell. Total products were obtained at a rate of 34 grams per hour. The main product was $ClC_2F_4OC_2F_4COF$, which was obtained in 60 percent yield.

This starting compound was prepared as in Example III starting with trifluorochloroethylene instead of tetrafluoroethylene.

*Example VI*

The initial charge to a standard cell was 1880 grams of anhydrous HF, 5 grams of NaF and 120 grams of $ClCFHCF_2OCH_2COCl$. The cell ran at 40 amperes and 5.6 to 6.0 volts for most of the seventy-hour run. Organic raw material was charged at a rate of 49 grams per hour. The yield of $ClCF_2CF_2OCF_2COF$ was 40 percent of theoretical compared to only a trace yield of $$C_2F_5OCF_2COF$$

from the unsubstituted raw material.

This starting compound was prepared in a manner the same as the starting compound of Example IV, except glycolic acid was used in place of the beta-chloro propionic acid.

*Example VII*

To a standard cell was charged 1900 grams of anhydrous HF, 100 grams of $BrCH_2C_2H_4COCl$ and 5 grams of sodium bifluoride. The cell was run at 40 amperes and 5.7 to 5.8 volts with additional organic charges of 19.8 grams per hour. The yield of c-$C_4F_8O$ was 36 percent of theoretical, compared to 24 percent for the unsubstituted raw material. The yield of $C_3F_7COF$ was 17 percent, compared to 34 percent for the unsubstituted raw material.

The starting compound of this example was prepared by reacting gamma-hydroxy butyric acid with $HB_r$, and the acid converted to the acid chloride with thionyl chloride.

*Example VIII*

A standard cell was charged with 1800 grams of anhydrous HF and 200 grams of $CH_3CHFCOF$. Subsequent organic charges were added at a rate of 19.8 grams per hour. The cell ran at 40 amperes and 5.9 volts for about sixty hours. The yield of $C_2F_5COF$ was 59 percent based on total effluent gas as compared to 44 percent when propionic acid fluoride was used as the starting material. Using α,α-difluoropropionic acid fluoride as the starting material under the same operating conditions, a yield of 86 percent of $C_2F_5COF$ was obtained.

This example shows that the substitution of fluorine on the alpha carbon atom of an acid fluoride starting compound substantially increases the yield of fluorinated acid fluoride by minimizing decarboxylation or fragmentation.

The monofluoropropionic acid fluoride was prepared by reacting the corresponding monochloropropionic acid with potassium fluoride followed by conversion to the acid fluoride. The difluoropropionic acid was prepared by reacting the ethyl ester of pyruvic acid with $SF_4$ following on hydrolysis to the acid. The acid was then converted to its acid fluoride by conventional methods.

*Example IX*

A 10-ampere laboratory cell was used for this run. The initial charge was 300 grams of anhydrous HF, 21 grams of $Cl(CH_2CF_2)_3SO_2F$ and 1.5 grams of NaF. Subsequent sulfonyl fluoride additions were made at a rate of 9 grams per hour during the sixty-hour run. The current averaged about 7.5 amperes at 6 to 7 volts. Most of the chlorine was retained in the products. The yield of total sulfonyl fluorides was about 50 percent of theoretical, compared to about 35 percent for the unsubstituted starting compound.

This starting compound was prepared by the telomerization of vinylidene fluoride using sulfuryl chlorofluoride as the telogen.

Example X

A standard cell was charged with 1940 grams of anhydrous HF, 60 grams of $C_6H_{13}CHClCH_2SO_2F$ and 5 grams of NaF. The organic starting compound was added at a rate of 10.8 grams per hour during the two-hundred-and-sixteen-hour run. The current averaged 40 amperes at 5.7 to 6.0 volts. Liquid products were obtained from the cell at a rate of 9.8 grams per hour. These products were about 48.5 percent $C_8F_{17}SO_2F$, 14.3 percent $C_6F_{13}CFClCF_2SO_2F$ and about 10 percent $C_8F_{18}$. The distribution and yield of product was about the same as for the unsubstituted starting compound. The example indicates the necessity for halogen substitution on the third carbon atom (fifth atom of the potential ring).

This starting compound was prepared by the addition of sulfuryl chlorofluoride to octene-1.

The use of various starting compounds to the electrolytic cell and the appropriate location of the halogen on such starting compounds will become apparent to those skilled in the art depending on the product desired, as the result of the teachings of this invention.

Having described my invention, I claim:

1. In a process for the electrochemical fluorination of an organic acid halide starting compound utilizing anhydrous liquid hydrogen fluoride, the improvement which comprises introducing into the electrochemical cell as the starting compound a partially chain halogen-substituted organic acid halide in which the halogen substitution is only fluorine and having attached to the acid halide radical an open chain comprising at least two skeletal atoms, which skeletal atoms are only carbon and not more than one hetero atom and that one hetero atom separated from the acid halide radical by at least one carbon atom, and having at least one of said skeletal carbon atoms of the chain selected from the group consisting of a hydrogen bearing carbon atom and an unsaturated carbon atom.

2. In a process for the electrochemical fluorination of an organic acid halide starting compound utilizing anhydrous liquid hydrogen fluoride, the improvement which comprises introducing into the electrochemical cell as the starting compound a partially chain halogen-substituted organic acid halide having attached to the acid halide radical an open chain comprising at least three skeletal atoms, which skeletal atoms are only carbon and not more than one hetero atom and that one hetero atom separated from the acid halide radical by at least one carbon atom, having at least one of said skeletal carbon atoms of the chain selected from the group consisting of a hydrogen bearing carbon atom and an unsaturated carbon atom and at least one of the third and fourth skeletal atoms having at least one halogen substitution and that halogen substitution being only fluorine or chlorine or both.

3. The process of claim 2 in which said acid halide is a carbonyl halide.

4. In a process for the electrochemical fluorination of an organic acid halide starting compound utilizing anhydrous liquid hydrogen fluoride, the improvement which comprises introducing into the electrochemical cell as the starting compound a partially chain halogen-substituted organic acid halide having attached to the acid halide radical an open chain comprising at least two skeletal atoms, which skeletal atoms are only carbon and not more than one hetero atom and that one hetero atom separated from the acid halide radical by at least one carbon atom, having at least one of said skeletal carbon atoms of the chain selected from the group consisting of a hydrogen bearing carbon atom and an unsaturated carbon atom and the alpha skeletal atom having at least one halogen substitution and that halogen substitution being only fluorine or chlorine or both.

5. In a process for the electrochemical fluorination of an organic acid halide starting compound utilizing anhydrous liquid hydrogen fluoride, the improvement which comprises introducing into the electrochemical cell as the starting compound a partially chain halogen-substituted organic acid halide having attached to the acid halide radical an open chain comprising at least three skeletal atoms, which skeletal atoms are only carbon and one hetero atom and that one hetero atom separated from the acid halide radical by at least one carbon atom, having at least one of said skeletal carbon atoms of the chain selected from the group consisting of a hydrogen bearing carbon atom and an unsaturated carbon atom and the carbon atom adjacent said hetero atom having at least one halogen substitution.

6. The process of claim 5 in which said hetero atom is oxygen.

7. In a process for the electrochemical fluorination of an organic carbonyl acid halide starting compound utilizing anhydrous liquid hydrogen fluoride, the improvement which comprises introducing into the electrochemical cell as the starting compound a partially chain halogen-substituted organic carbonyl halide having attached to the carbonyl halide radical an open chain comprising at least three skeletal atoms, which skeletal atoms are only carbon having at least one of said skeletal carbon atoms of the chain selected from the group consisting of a hydrogen bearing carbon atom and an unsaturated carbon atom and at least one of the third and fourth skeletal carbon atoms having at least one bromine or iodine substitution.

References Cited by the Examiner

UNITED STATES PATENTS

| | | | |
|---|---|---|---|
| 2,717,871 | 9/1955 | Scholberg et al. | 204—59 |
| 2,732,398 | 1/1956 | Brice et al. | 204—59 |
| 2,806,817 | 9/1957 | Wolfe | 204—59 |

JOHN H. MACK, *Primary Examiner.*

H. S. WILLIAMS, *Assistant Examiner.*

UNITED STATES PATENT OFFICE
CERTIFICATE OF CORRECTION

Patent No. 3,274,081                                            September 20, 1966

Wilbur H. Pearlson

It is hereby certified that error appears in the above numbered patent requiring correction and that the said Letters Patent should read as corrected below.

Column 1, line 42, for "hydrogen is" read -- hydrogen fluoride is --; column 3, line 73, for "carbon of" read -- carbon atom of --; column 4, line 47, for "$\rightarrow C_4F_8O$" read -- $c\text{-}C_4F_8O$ --; line 48, "$\rightarrow c\text{-}CF_4C_4F_7O$" read -- $c\text{-}CF_3C_4F_7O$ --; line 49, for "$\rightarrow C_5F_{10}O$" read -- $c\text{-}C_5F_{10}O$ --.

Signed and sealed this 29th day of August 1967.

(SEAL)
Attest:

ERNEST W. SWIDER
Attesting Officer

EDWARD J. BRENNER
                                                                             Commissioner of Patents